Figure 1:
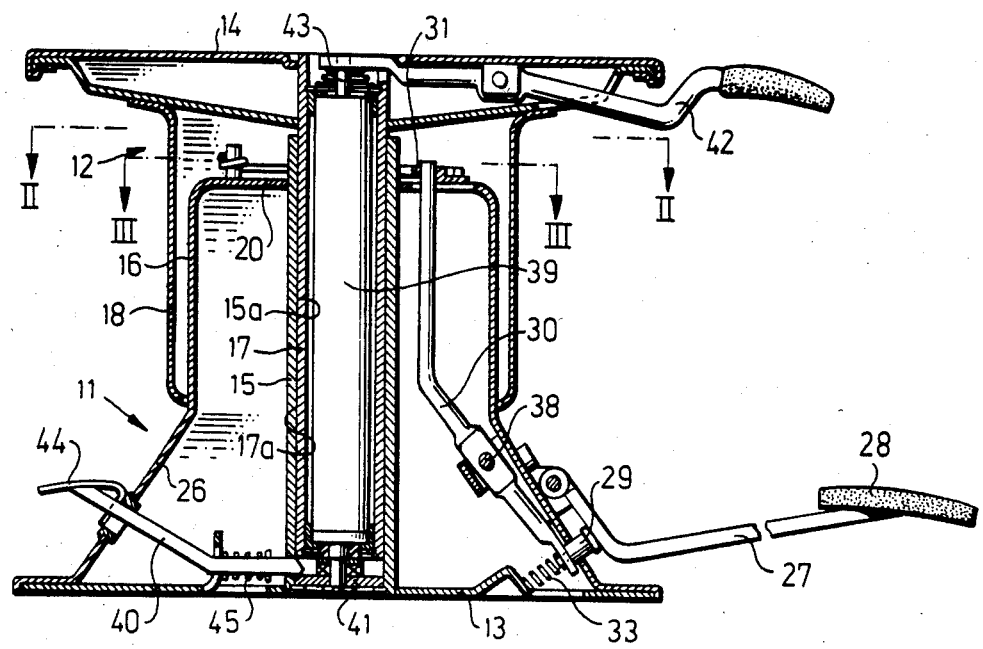

United States Patent [19]

Mattsson

[11] Patent Number: 4,601,454
[45] Date of Patent: Jul. 22, 1986

[54] TELESCOPIC SUPPORTING POST
[75] Inventor: Lars B. E. Mattsson, Sävar, Sweden
[73] Assignee: Svenska Vision AB, Stockholm, Sweden
[21] Appl. No.: 642,246
[22] Filed: Aug. 20, 1984
[30] Foreign Application Priority Data
Aug. 22, 1983 [SE] Sweden .................. 8304543
[51] Int. Cl.⁴ ............................................. A47C 3/20
[52] U.S. Cl. ............................... 248/418; 248/406.1
[58] Field of Search .................. 248/418, 406.1, 406.2, 248/407, 408, 409, 188.5, 161

[56] References Cited
U.S. PATENT DOCUMENTS

| 316,281 | 4/1885 | Matthie | 248/415 |
| 2,106,650 | 1/1938 | Owler | 248/418 |
| 3,443,784 | 5/1969 | Walkinshaw | 248/408 |
| 4,021,126 | 5/1977 | Deeter | 248/408 |

FOREIGN PATENT DOCUMENTS

| 2530944 | 1/1977 | Fed. Rep. of Germany . | |
| 3104049 | 8/1982 | Fed. Rep. of Germany . | |
| 457760 | 6/1950 | Italy | 248/408 |
| 7408217 | 10/1977 | Sweden . | |
| 1473284 | 5/1977 | United Kingdom . | |
| 1514698 | 6/1978 | United Kingdom . | |

Primary Examiner—Reinaldo P. Machado
Assistant Examiner—Alvin Chin-Shue
Attorney, Agent, or Firm—Fleit, Jacobson, Cohn & Price

[57] ABSTRACT

A telescopic supporting post (10) comprises two mutually displaceable telescope members (11, 12), each comprising an inner tubular portion (15, 17) of small diameter and an outer tubular portion (16, 18) of large diameter. Said inner portions (15, 17) are provided with cooperating bearing surfaces (15a, 17a) by which the two telescope members (11, 12) are mounted for axial displacement relatively to each other. Said outer portions (16, 18) are provided with cooperating interengagement means (19, 21) for holding the two telescope members (11, 12) against mutual rotation. In order to avoid the need for a separate turntable when it is desired to permit rotary movement of a chair supported by the post (10), said interengagement means (19, 21) are arranged for releasable engagement with each other, whereby the two telescope members may be rotated relatively to each other, utilizing said bearing surfaces also as rotary bearing surfaces, when said interengagement means are out of engagement with each other.

4 Claims, 4 Drawing Figures

TELESCOPIC SUPPORTING POST

The present invention relates to a telescopic supporting post. More particularly, the invention relates to such a supporting post of the kind comprising two mutually displaceable telescope members, each having an inner tubular portion of comparatively small diameter and an outer tubular portion of comparatively large diameter, the inner portions of the two telescope members being provided with cooperating bearing surfaces by which the two telescope members are journalled for axial displacement relatively to each other, while the outer portions of the two telescope members are provided with cooperating interengagement means for holding the telescope members against mutual rotation.

A supporting post of said kind is previously known through British patent specification No. 1,514,698 which discloses a vehicle chair support structure comprising, in addition to the supporting post, also a turntable, mounted on said post. While, in said known support structure the telescopic supporting post serves to permit an adjustment of the vertical position of the chair, the turntable has been added in order to make it possible to rotate the chair.

An object of the present invention is to provide an improved supporting post of the kind initially specified which need not be provided with any turntable or other similar additional equipment in order to facilitate any desired rotary movement of a chair or other arrangement supported by said post.

In accordance with the invention, for said object, there is provided a supporting post of said kind, characterized in that the interengagement means are arranged for releasable engagement with each other, so as to prevent relative rotary movement between the two telescope members, when in engagement with each other, while permitting the two telescope members to rotate relatively to each other, utilizing said bearing surfaces also as rotary bearing surfaces, when out of engagement with each other.

By arranging the interengagement means for releasable engagement with each other, as proposed according to the invention, it is possible to omit the turntable required in prior art support structures, as any desired rotation of a supported chair or other supported arrangement may be obtained through mutual rotation of the two telescope members of the telescopic supporting post.

Preferably, the interengagement means include at least one first interengagement means, provided in radially fixed position on the outer portion of one telescope member, and at least one second interengagement means, mounted for movement in a generally radial direction on the outer portion of the other telescope member and spring-biased towards a position for engagement with the interengagement means of the first-mentioned telescope member, said second interengagement means being operatively connected to an operating means by which it may be moved from its engagement position to a release position in which it is out of engagement with said first interengagement means.

In a preferred embodiment of the invention, the supporting post also comprises a locking means for releasably locking said second interengagement means in its engagement position. Said locking means may preferably be spring-biased towards a locking position in which it locks said second interengagement means.

Additionally, said locking means may be moveable from its locking position to a release position by means of said operating means, which may be connected to said second interengagement means through a dead-motion connection which serves to ensure that the operating means will not actuate said second interengagement means until the locking means has been moved to its release position.

Figure 2:
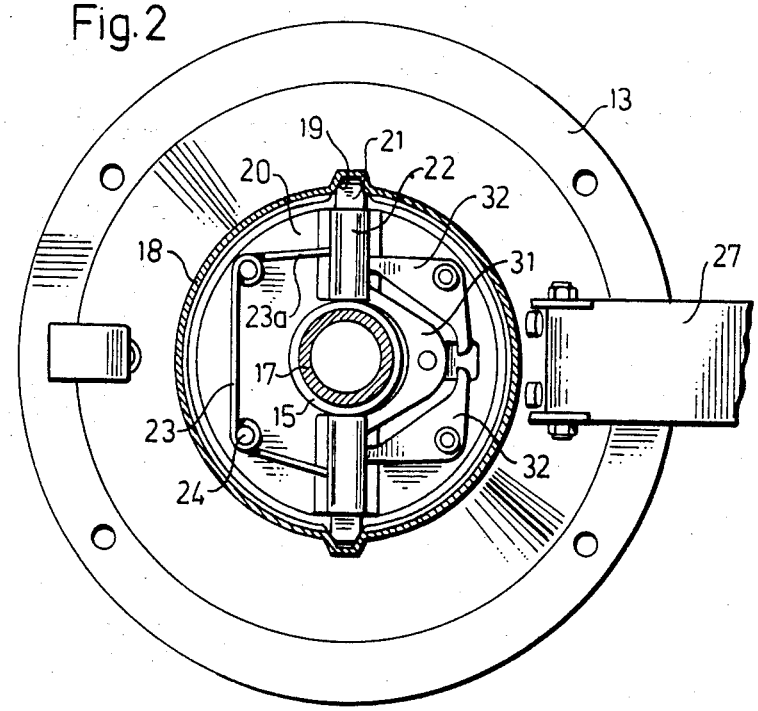
Figure 3:
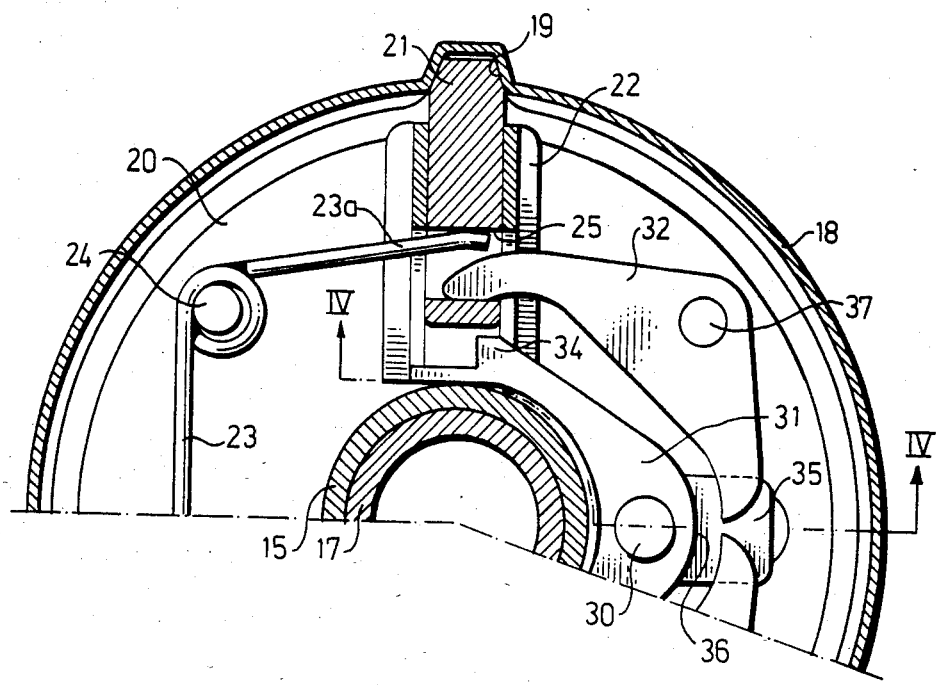
Figure 4:
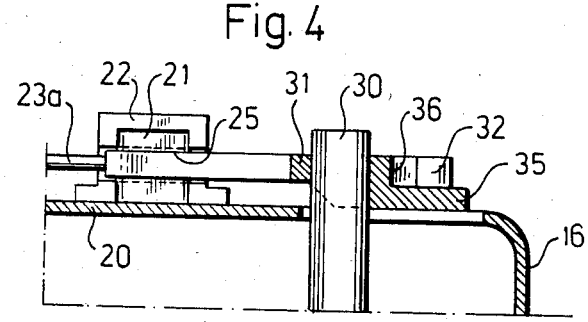

Below the invention will be described in further detail, reference being had to the accompanying drawings, in which:

FIG. 1 shows a vertical section through a telscopic supporting post according to an embodiment of the invention, selected by way of example, FIG. 2 is a horizontal view, in section, taken along line II—II in FIG. 1, FIG. 3 is a partial horizontal view, on an enlarged scale and in section, taken along line III—III in FIG. 1, while FIG. 4 shows a partial view, in section, taken along line IV—IV in FIG. 3.

The supporting post shown in the drawings and generally designated 10 is primarily intended to be used for supporting a vehicle chair, such as the driver's seat in an automobus. However, it may be utlized also in other instances where it is desirable to permit a rapid and easy adjustment of the vertical position and the rotary position of a chair or other arrangement mounted on the supporting post.

The supporting post 10 is of telescopic construction and comprises two telescope members which are mutually displaceable in vertical direction and consist of a lower telescope member 11 and an upper telescope member 12. At its lower end, the lower telescope member 11 is provided with a base plate 13 by which supporting post 10 may be mounted on any suitable bedding, such as a vehicle floor. Similarly, at its upper end, the upper telescope member 12 is provided with a plate 14 on which a chair or any desired other arrangement may be mounted in any suitable manner to become supported by supporting post 10.

The lower telescope member 11 comprises an inner tubular member 15 of comparatively small diameter and an outer tubular member 16 of comparatively large diameter. Similarly, the upper telescope member 12 comprises an inner tubular member 17 of comparatively small diameter and an outer tubular member 18 of comparatively large diameter. Said tubular postions of each telescope member are rigidly connected to the appurtenant plate 13 and 14, respectively.

The inner tubular portion 17 of upper tubular member 12 is mounted axially displaceable and rotatable within the inner tubular portion 15 of lower telescope member 11. The required cooperating bearing surfaces are formed by the outer cylindrical surface 17a of portion 17 and the inner cylindrical surface 15a of portion 15.

The outer tubular portions 16 and 18 of the two telescope members 11 and 12, respectively, are provided with cooperating interengagement means by which the two telescope members may be releasably locked in mutually non-rotatable but axially displaceable relationship to each other. These interengagement means consist of two diametrically opposite longitudinal guide grooves 19 in portion 18 and two sliding blocks 21 which are mounted on an upper end wall 20 of portion 16 and adapted to engage each in one of said guide grooves 19.

Each sliding block 21 is displaceably received in one of two brackets 22 which are mounted diametrically opposite to each other on end wall 20 and arranged to form radially extending guiding means for the sliding blocks. By means of a spring 23, sliding blocks 21 are spring-biased in radial outward directions. Hereby, the opposite mutually converging lateral surfaces of the outer end portions of sliding blocks 21 are normally held in contact under certain pressure against the cooperating mutually converging lateral surfaces of guide grooves 19.

Spring 23 is held in position on end wall 20 by being threaded with two eye-like portions thereof on two pins 24 which are mounted in upstanding positions on said wall. Moreover, in order to spring-bias sliding blocks 21 as above described, spring 23 acts on said blocks by means of end portions 23a which extend into through holes 25 of rectangular cross-section provided in sliding blocks 21.

In the drawings, sliding blocks 21 have been shown in radially expanded positions in which they engage with guide grooves 19 to connect the two telescope members 11 and 12 non-rotatably to each other. By means of an operating mechanism, sliding blocks 21 may be moved radially inwards from said expanded positions to retracted release positions, in which they are located out of engagement with guide grooves 19 and permit relative rotary movement between telescope members 11 and 12. The primary operating means of said operating mechanism is formed by an operating arm 27 which is pivotally mounted on a lower conically widened section 26 of portion 16 and provided with a pedal 28. Further, the operating mechanism also comprises a push button 29 which may be actuated by arm 27, a double-armed level 30, actuated by said push button 29, a yoke-shaped member 31, connected to lever 30, and two double-armed levers 32 which are arranged to be actuated by member 31. Reference numeral 33 designates a spring which serves to hold lever 30, push button 29 and member 31 in their positions shown in the drawings. Member 31 then acts as a locking means for sliding blocks 21 preventing them from moving out of engagement with guide grooves 19. This locking function occurs due to the fact that the wider portions 34 of the legs of member 31 are located behind sliding blocks 21.

As can be seen from FIGS. 3 and 4, one arm of each lever 32 extends into through hole 25 of the appurtenant sliding block 21, while the other arm of each lever 32 is located above a flat tongue 35, projecting from the central web portion of member 31. In the illustrated situation, the free end portions of the latter arms of lever 32 are located at some distance from a cooperating actuating surface 36 on member 31. Hereby, a dead-motion connection is obtained between operating arm 27 and levers 32, resulting in that, when pedal 28 is depressed, the initial depression of the pedal will not result in any actuation of sliding blocks 21 but only in a displacement of member 31. Thus, only when member 31 has been moved sufficiently to the right, according to FIG. 3, to move portions 34 out of the path of movement of sliding blocks 21, further depression of pedal 28 may actuate levers 32 and cause them to be swung around their pivot pins 37 so as to move sliding blocks 21 to their retracted release positions.

As can be seen from FIG. 1, lever 30 is located entirely on the inner side of portion 16 and it is mounted on a pivot pin 38 secured to the inner surface of said portion. This arrangement makes it possible in an easy manner, to replace operating arm 27, pedal 28 and push button 29 by any other suitable operating means, such as an electromagnet or a pneumatic or hydraulic operation means.

Reference numeral 39 designates a gas spring, the cylindrical casing of which is mounted in a fixed position within the inner tubular portion 17 of upper telescope member 12, while its piston rod is provided with an anchor plate 41 which is held releasably connected to the inner tubular portion 15 of lower telescope member 11 by means of a spring-biased locking rod 40. Reference numeral 42 designates an operating lever for gas spring 39 by which a pin-shaped operating means 43 at the upper end of the gas spring may be actuated to permit an adjustment of the vertical position of the upper telescope member 12 relatively to the lower telescope member 11.

The releasable connection between plate 41 and inner tubular portion 15 of lower telescope member 11 makes it possible in an easy manner to disconnect upper telescope member 12 from lower telescope member 11 and then to lift it away therefrom. Such a disconnection may be obtained simply by depressing pedal 44 provided at the outer end of locking rod 40. The inner end portion of locking rod 40 will then be displaced to the left, according to FIG. 1, against the action of spring 45, whereby anchor plate 41 is released.

The invention is not restricted to the embodiment above described and shown in the drawings. Instead, many modifications are possible within the scope of the invention. For instance, it could be mentioned that the number of guide grooves 19 may be increased in order to make it possible to lock the upper telescope member 12 in more than two different rotary positions relatively to the lower telescope member 11.

I claim:

1. A telescopic supporting post comprising:
   two mutually displaceable telescope members, each of said two mutually displaceable telescope members having an inner tubular portion of comparatively small diameter and an outer tubular portion of comparatively large diameter, the inner portions of the two mutually displaceable telescope members being provided with cooperating bearing surfaces by which the two mutually displaceable telescope members are journalled for axial displacement relative to each other,
   the outer portions of the two mutually displaceable telescope members being provided with cooperating interengagement means for holding the two mutually displaceable telescope members against mutual rotation and in axial alignment during telescopic displacement,
   said cooperating interengagement means being arranged for releasable engagement with each other to prevent relative rotary movement between the two mutually displaceable telescope members when said cooperating interengaging means are in engagement with each other and to permit the two mutually displaceable telescope members to rotate relative to each other, utilizing said bearing surfaces as rotary bearing surfaces, when said cooperating interengaging means are out of engagement with each other.

2. A telescopic supporting post comprising:
   two mutually displaceable telescopic members each of said two mutually displaceable telescope members having an inner tubular portion of comparatively small diameter and an outer tubular portion of comparatively large diameter, the inner portions of the two mutually displaceable telescope members being provided with cooperating bearing surfaces by which the two mutually displaceable telescope members are journalled for axial displacement relative to each other, and the outer portions of the two mutually displaceable telescope members being provided with cooperating interengagement means for holding the two mutually displaceable telescope members against mutual rotation and in axial alignment during telescopic displacement, said cooperating interengagement means being arranged for releasable engagement with each other to prevent relative rotary movement between the two mutually displaceable telescope members when said cooperating interengaging means are in engagement with each other in an engagement position and to permit the two mutually displaceable telescope members to rotate relative to each other, utilizing said bearing surfaces as rotary bearing surfaces, when said cooperating interengaging means are out of engagement with each other in a release position, said cooperating interengagement means includes at least one first interengagement means provided in a radially fixed position on the outer portion of one of said two mutually displaceable telescope members, and at least one second interengagement means mounted for movement in a generally radial direction on the outer portion of the other of said two mutually displaceable members and being biased towards a position for engagement with said at least one first interengagement means, said second interengagement means being operatively connected to an operating means for movement by said operating means from said engagement position to said release position where said second engagement means is located out of engagement with said at least one first interengagement means.

3. A telescopic supporting post comprising:

two mutually displaceable telescopic members each of said two mutually displaceable telescope members having an inner tubular portion of comparatively small diameter and an outer tubular portion of comparatively large diameter, the inner portions of the two mutually displaceable telescope members being provided with cooperating bearing surfaces by which the two mutually displaceable telescope members are journalled for axial displacement relative to each other, the outer portions of the two mutually displaceable telescope members being provided with cooperating interengagement means for holding the two mutually displaceable telescope members against mutual rotation and in axial alignment during telescopic displacement, said cooperating interengagement means being arranged for releasable engagement with each other to prevent relative rotary movement between the two mutually displaceable telescope members when said cooperating interengaging means are in engagement with each other in an engagement position and to permit the two mutually displaceable telescope members to rotate relative to each other, utilizing said bearing surfaces as rotary bearing surfaces, when said cooperating interengaging means are out of engagement with each other in a release position, said cooperating interengagement means includes at least one first interengagement means provided in a radially fixed position on the outer portion of one of said two mutually displaceable telescope members, and at least one second interengagement means mounted for movement in a generally radial direction on the outer portion of the other of said two mutually displaceable members and being biased towards a position for engagement with said at least one first interengagement means, said second interengagement means being operatively connected to an operating means for movement by said operating means from said engagement position to said release position where said second engagement means is located out of engagement with said at least one first interengagement means, and a locking means for releasably locking said second interengagement means in said engagement position, said locking means being biased towards a locking position for locking said second interengagement means in said at least one first interengagement means.

4. A telescopic supporting post according to claim 3, wherein said locking means is movable from said locking position to an unlocking position by said operating means, said operating means being connected to said second interengagement means through a dead-motion connection ensuring that the operating means actuates said second interengagement means only upon preceding movement of the locking means to its unlocking position.

* * * * *